United States Patent [19]

Putman et al.

[11] Patent Number: 5,159,562

[45] Date of Patent: Oct. 27, 1992

[54] OPTIMIZATION OF A PLURALITY OF MULTIPLE-FUEL FIRED BOILERS USING ITERATED LINEAR PROGRAMMING

[75] Inventors: Richard E. J. Putman, Oakmont; Thomas Allen, Springdale; John J. Novacek, North Huntingdon; Frederick G. Huff, Pittsburgh, all of Pa.

[73] Assignee: Westinghouse Electric Corp., Pittsburgh, Pa.

[21] Appl. No.: 859,250

[22] Filed: Mar. 26, 1992

Related U.S. Application Data

[63] Continuation of Ser. No. 560,400, Jul. 31, 1990, abandoned.

[51] Int. Cl.$^5$ .................. G06F 15/46; G06F 15/20; G06F 9/06
[52] U.S. Cl. ............................ 364/494; 364/138
[58] Field of Search .............. 364/492, 493, 494, 495, 364/161, 165; 60/39.3, 39.55, 463; 290/7; 236/14

[56] References Cited

U.S. PATENT DOCUMENTS

| | | | |
|---|---|---|---|
| 4,027,145 | 5/1977 | McDonald et al. | 364/494 |
| 4,271,473 | 6/1981 | Ross | 364/494 |
| 4,297,848 | 11/1981 | Silvestri, Jr. | 364/494 |
| 4,319,320 | 3/1982 | Sato et al. | 364/494 |
| 4,403,293 | 9/1983 | Bradt et al. | 364/494 |
| 4,500,950 | 2/1985 | Putman | 364/138 |
| 4,577,280 | 3/1986 | Putman | 364/494 |
| 4,604,714 | 8/1986 | Putman et al. | 364/494 |
| 4,628,462 | 12/1986 | Putman | 364/494 |
| 4,802,100 | 1/1989 | Aasen et al. | 364/494 |
| 4,805,114 | 2/1989 | Putman et al. | 364/494 |
| 4,977,529 | 12/1990 | Gregg et al. | 364/492 |

OTHER PUBLICATIONS

Wagner, Harvey, M., *Principles of Operations Research*, 2nd Ed., Prentice-Hall, Inc., 1975, pp. 35-38.

Box, George, "Evolutionary Operation: A Method for Increasing Industrial Productivity", *Applied Statistics*, vol. VI, No. 2, 1957, pp. 81-101.

Carpenter and Sweeny, "Process Improvement with 'Simplex' Self-Directing Evolutionary Operation," *Chemical Engineering*, Jul. 5, 1965, pp. 117-126.

*Primary Examiner*—Kevin J. Teska
*Attorney, Agent, or Firm*—Z. L. Dermer

[57] ABSTRACT

A linear programming matrix is used to represent a complex process with many interrelated process variables. Assumptions are initially made regarding the values of the matrix elements, based on current or expected operation of the process. After the linear programming matrix is solved, the values of the coefficients are modified according to a test strategy and the linear programming matrix is again solved in an effort to obtain a better result. This process is repeated until solutions of matrix converge and the amount of modification of the matrix is minimal. One test strategy that can be used is SIMPLEX self-directing evolutionary operation. Another test strategy uses progressively more accurate linear approximations of nonlinear relationships in the linear programming matrix.

12 Claims, 6 Drawing Sheets

OPTIMIZATION OF A PLURALITY OF MULTIPLE-FUEL FIRED BOILERS USING ITERATED LINEAR PROGRAMMING

This application is a continuation of application Ser. No. 07/560,400, filed Jul. 31, 1990, now abandoned.

BACKGROUND OF THE INVENTION

1. Field of the Invention

The present invention is directed to optimizing operation of a system having many interdependent variable operating conditions which may have non-linear relationships and, more particularly, to optimizing the operation of an energy producing system having a plurality of interrelated components.

2. Description of the Related Art

Optimization techniques are commonly used to maximize production or minimize cost of operating industrial processes, particularly with regard to the consumption of energy and the correlated production output. Several techniques have been applied to chemical engineering to establish operating conditions that yield a maximum return on investment while minimizing operating costs. These techniques include linear programming and evolutionary operation. Application of these techniques to optimizing cogeneration boiler systems for producing steam and electricity are disclosed in U.S. Pat. Nos. 4,604,714 and 4,805,114 to R. E. Putman et al. which are incorporated herein by reference.

Of the two techniques mentioned above, linear programming is fairly well known, while evolutionary operation is much less commonly used since it was originally developed as a manual system in the 1960's when powerful online computers were not available. Linear programming application software is available commercially, e.g., LP88 from Eastern Software Products, Inc. of Alexandria, Virginia. A particularly useful form of evolutionary operation was described in "Process Improvement with SIMPLEX Self-Directing Evolutionary Operation" by E. H. Carpenter and H. C. Sweeney, *Chemical Engineering*, Jul. 5, 1965, pp. 117–126. The evolutionary operation technique described in this article will be referred to herein as SSDEVOP.

The SSDEVOP technique modifies the setting of several key process variables to find a setting for an industrial process which results in maximum production or minimum costs, while taking into account predetermined constraints of the variables. The selected process variables are assigned different values in a set of experiments which in the original technique are conducted on the actual industrial process. The results are compared and a new base case is produced by averaging the setting of each process variable for all except the test which produced the worst case results, doubling this average and subtracting the worst case results. This base case is then used to produce a new set of tests by adding or subtracting small amounts to or from the setting of each variable. The results of the tests in a set of experiments is analyzed to find new best and worst cases and to produce a new base case and a new set of experiments from that base case. The process is repeated until there is little improvement in the best result. At this time, the amount of change from one test to another in a set of tests can be reduced for a new set of tests so that a more precise optimum setting for the process can be determined. The '714 and '114 patents teach application of SSDEVOP to the process of generating steam and electricity in a cogeneration system. At the end of the '114 patent it is suggested that SSDEVOP be used to optimize load and fuel distribution in pairs of boilers which are part of a much larger system where the load and fuel distribution of the large system is determined by a linear programming matrix. However, there is no suggestion of how to optimize the performance of a process having many non-linear relationships between process variables. A linear programming matrix can handle many variables, but by definition does not handle non-linear relationships. The SSDEVOP technique handles non-linear relationships, but becomes unwieldy as the number of selected variables increases beyond four.

SUMMARY OF THE INVENTION

An object of the present invention is to provide a technique for optimizing processes having five or more non-linear relationships.

Another object of the present invention is to provide a technique for optimizing the operations of a plurality of multiple-fuel fired boilers which produce a total amount of steam.

Yet another object of the present invention is to determine appropriate coefficients for a model of a system including a combustion turbogenerator, a steam generator and a heat recovery steam generator.

The above objects are attained by providing a method for optimizing control of a process having interdependent operating conditions determined by a control unit, comprising the steps of: defining relationships between the operating conditions, all constraints on the process and a process variable to be optimized, in a linear programming matrix; assigning initial values to matrix elements in the liner programming matrix; executing a computer program to solve the linear programming matrix; modifying selected matrix elements representing a set of the operating conditions according to a test strategy and adjusting any unselected matrix elements that require change due to the modifying; executing the computer program to produce a solution of the linear programming matrix after completing the modifying; repeating the modifying and executing of the computer program on the modified linear programming matrix for each test defined by the test strategy until convergence of the solution of the linear programming matrix; and adjusting the control unit to establish the operating conditions indicated by the solution of the linear programming matrix resulting at the convergence In one application of the present invention the test strategy used is simplex self-directing evolutionary operation. This method is particularly useful when the process to be optimized is the production of steam by a plurality of multiple-fuel fired boilers, such as a system having four boilers each capable of receiving three different types of fuel.

In another application of the present invention the process to be optimized is the production of steam and electricity by a system having a gas turbogenerator, a steam generator and a heat recovery steam generator. In this application the linear programming matrix includes energy balance equations for the system. The selected matrix elements are modified by calculating first values representing a first steady state model based on the initial solution of the linear programming matrix and second values representing a second steady state model based upon slight modifications to the initial solution The first values are assigned to the selected matrix elements representing the first steady state model and local linear models determined as a function of the assignment made by the first steady state model are assigned to the selected matrix elements which represent effects of change from conditions in the first steady state model. The modification and execution steps are repeated until an accurate model is being used for the system to produce steam and electricity with optimal settings.

DESCRIPTION OF THE PREFERRED EMBODIMENTS

The simplex self-directing evolutionary operation technique is summarized in the '714 patent as a method based on a matrix of several process variables disturbed by a predetermined increment successively in accordance with a series of tests revealing an improved situation, after which, based on the best results attained, a new set of values for the process variables is in turn disturbed, and this is repeated until the results converge on an optimum. While originally the SSDEVOP technique was applied to the process itself, the '714 patent discloses that the SSDEVOP technique can be applied to a set of equations which simulate a process.

Figure 1:
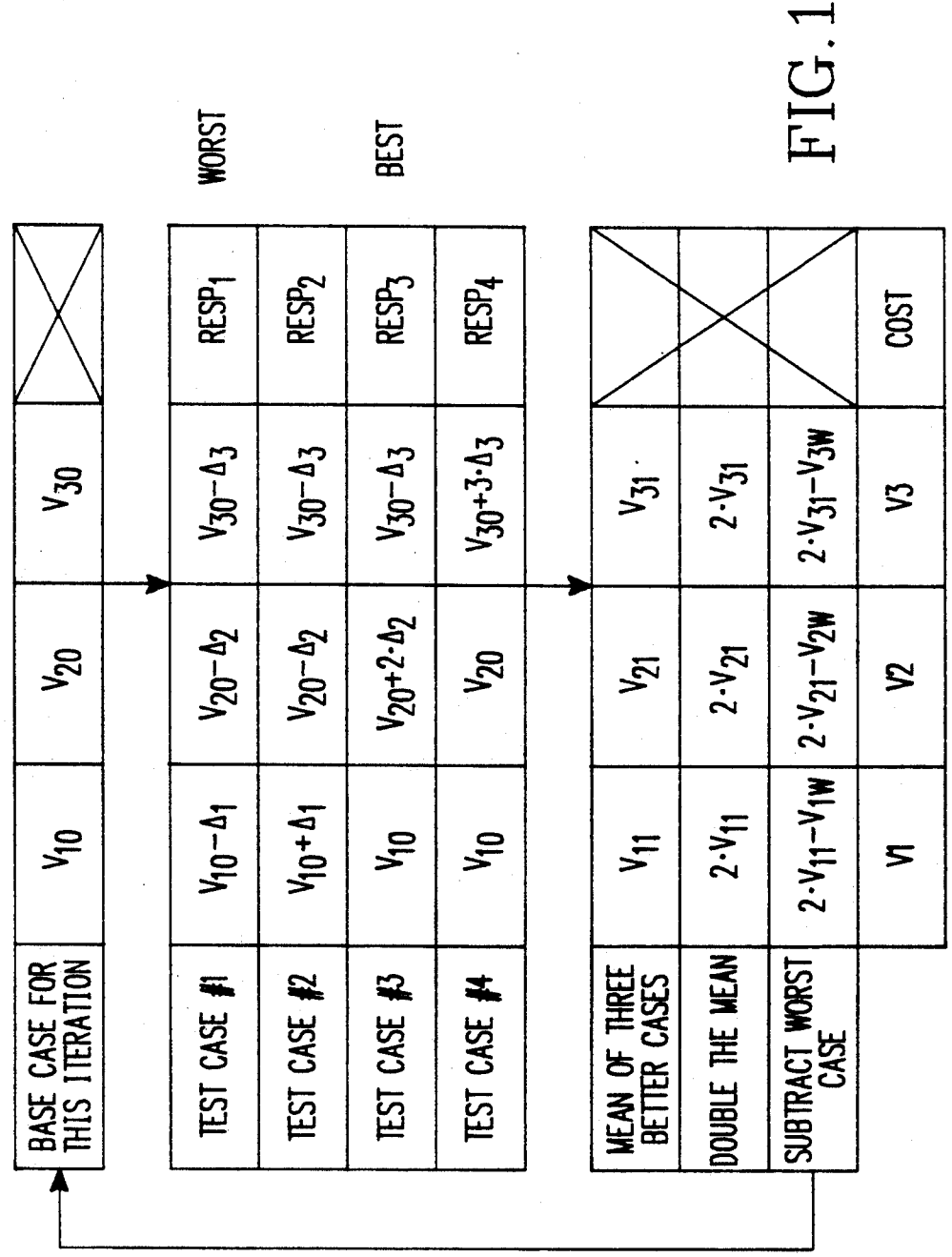
FIG. 1 is a tabulation of variables using simplex self-directing evolutionary operation.

With reference to an illustration of the SSDEVOP process in FIG. 1, initially some assumptions are made regarding the operation of the process. These assumptions are used to produce an initial base case for SSDEVOP. The assumptions may be based upon current settings if the process is already in operation, or that all components are operating at maximum efficiency (this is typically impossible or improbable, but at least provides a starting point for a system under design), or simply a best guess of the values. The base case is then used to produce $n+1$ test cases where n is the number of process variables in the optimizing set which are permitted to change. The test cases preferably use a pattern of changes like those illustrated in the middle block of FIG. 1.

The values of the process variables which are changed are used as a set of experiments or simulation runs to produce responses $RESP_1$-$RESP_4$. The mean of each variable in the three better cases is doubled and the value of the corresponding variable in the worst case is subtracted to produce a new base case. When the response of the best case from one iteration to the next does not change significantly, the response of the best case in the last two iterations can be used as the settings for the process or as a base case for a new sequence of tests using smaller changes, i.e., smaller values of $\Delta 1$-$\Delta 3$.

By carefully selecting the variables modified by the SSDEVOP technique, i.e., the boiler load on each of two dual-fuel fired boilers and one of the two fuels supplied to each of the boilers, it is possible to apply SSDEVOP to a system having two dual-fuel fired boilers, as disclosed in the '114 patent. However, if the number of boilers or the number of fuels supplied to each boiler is increased, it is no longer possible to use the SSDEVOP technique for four variables illustrated in FIG. 1. As the number of variables increase, the number of tests that must be run increases and the selection of a proper SSDEVOP test strategy, i.e., the pattern of changes from one test to the next, can become very difficult.

Figure 2A:
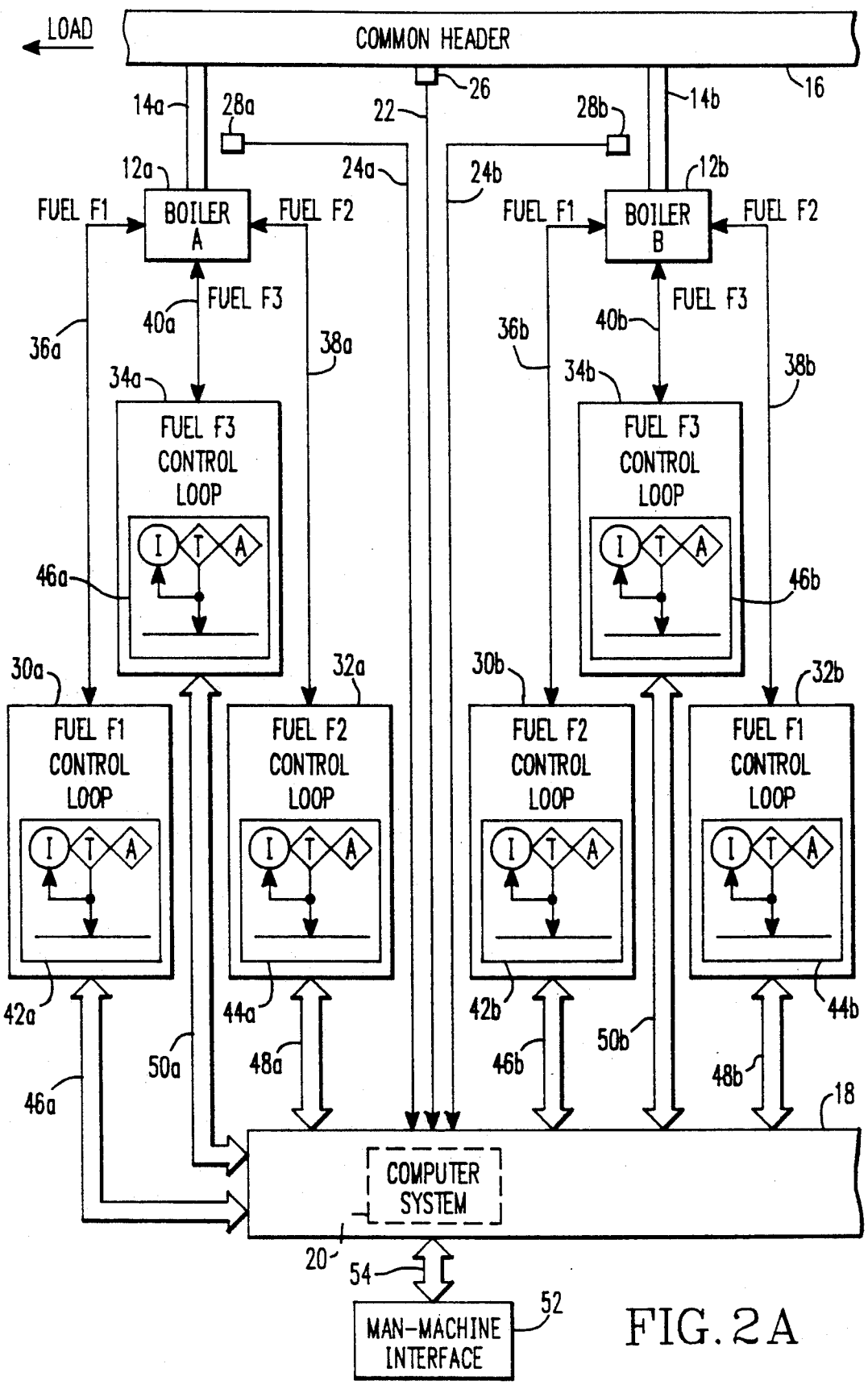
FIG. 2 is a block diagram of a steam producing system having a plurality of multiple-fuel fired boilers.
Figure 2B:
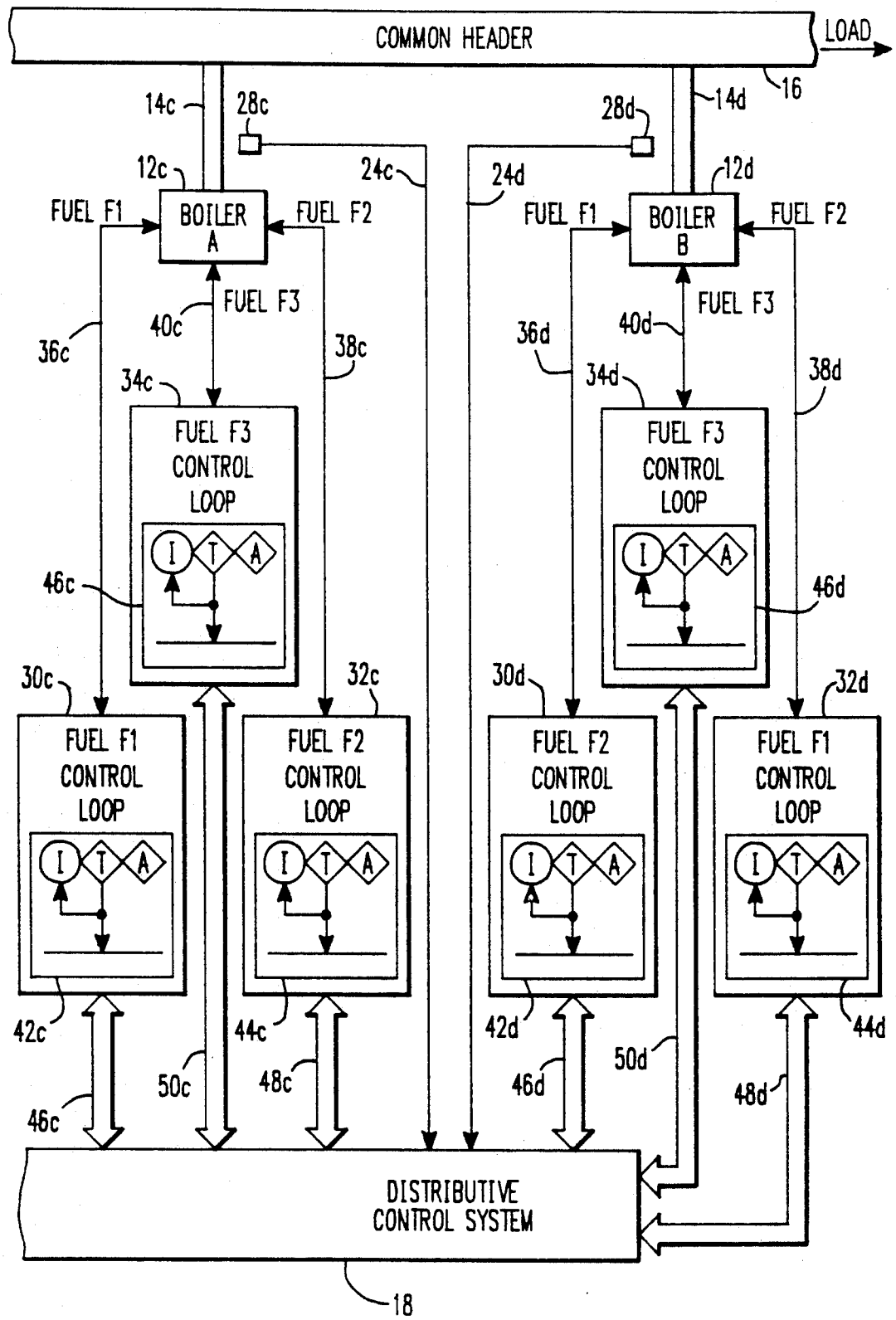

An example of a system having a plurality of multiple-fuel fired boilers which would be difficult to optimize using SSDEVOP is illustrated in FIG. 2. Four boilers $12a$-$12d$ are capable of outputting steam via steam lines $14a$-$14d$, respectively, to a common header 16 which supplies the steam to a steam turbogenerator or other processes using steam in a cogeneration system. Control of the overall operation of the system, or at least the boilers $12a$-$12d$, is provided by a distributed control system 18 which includes a computer system 20. Data is provided to the distributed control system 18 via signal lines 22, $24a$-$24d$ from a pressure transducer 26 mounted on the common header 16 and pressure transducers $28a$-$28d$ corresponding to the steam lines $14a$-$14d$.

Each of the boilers in the embodiment illustrated in FIG. 2 can receive three fuels, e.g., coke oven gas, blast furnace gas and oil. As a result, there are twelve interdependent variables, i.e., fuel/boiler combinations, in the system illustrated in FIG. 2. Due to the similarities of the components controlling fuel supplied to the boilers, the following discussion will describe control of a boiler without use of the letter identifying which boiler is being described. Each fuel is supplied to the boiler 12 under the control of control loops 30, 32, 34. Communication between the boiler 12 and the control loops 30, 32, 34 as well as delivery of fuel is provided by bi-directional links 36, 38, 40, respectively. Each fuel control loop includes a manual/automatic transfer control element 42, 44 or 46 which permits manual override of automatic operation provided by the distributed control system 18 in a conventional manner. Communication between the control loops 30, 32, 34 and the distributed control system 18 is provided by communication lines 46, 48, 50, respectively.

The distributed control system 18 determines which boilers are operating and which fuels in what amounts are being supplied to the operating boilers to produce a requested steam load in the common header 16. This control is accomplished with the aid of additional control devices (not shown) associated with the boilers, e.g., master control loops. In addition to receiving data from the transducers and control loops, the distributed control system 18 receives instructions and displays status of the system from and to a man-machine interface 52 via a bi-directional communication link 54. Typically, the man-machine interface 52 is provided by a keyboard and video terminal.

Figure 3:
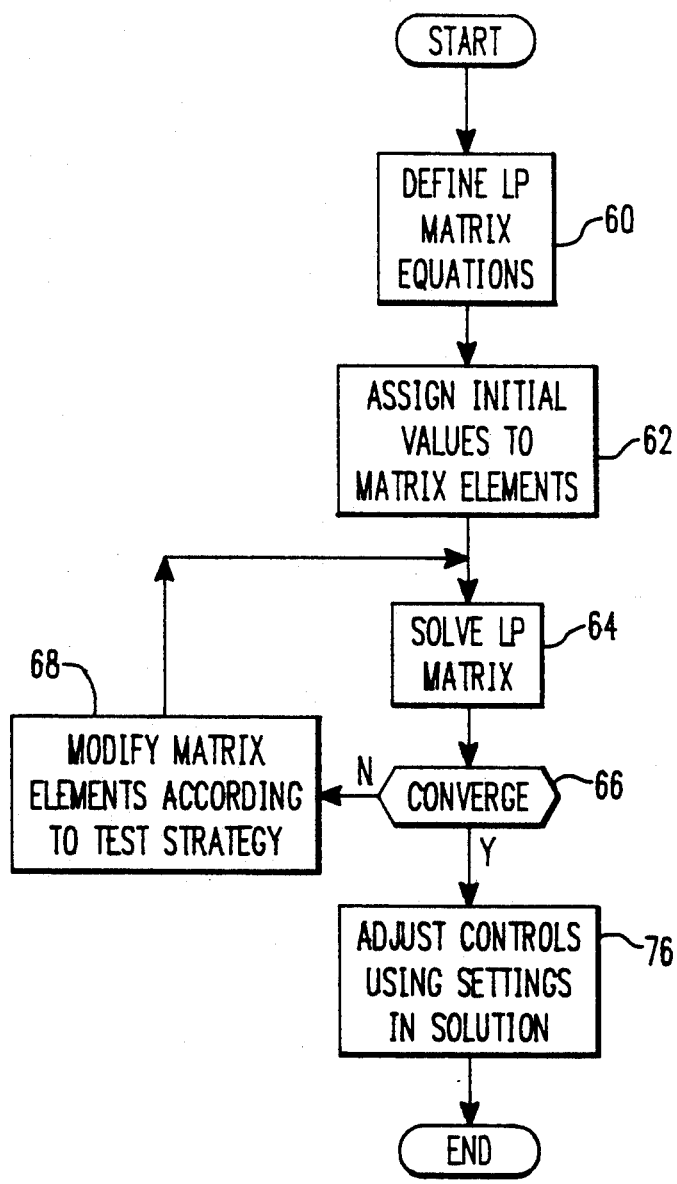
FIG. 3 is a flowchart of a method according to the present invention.

According to the present invention, the computer system 20 in the distributed control system 18 determines an optimal solution by applying the method illustrated in FIG. 3. Prior to controlling the system illustrated in FIG. 2, it is necessary to define linear programming matrix equations for the system. The step of defining 60 is performed manually and while unique for each boiler, should not be difficult to accomplish by anyone of ordinary skill in the art of designing or operating steam generator systems of the type illustrated in FIG. 2. The equations preferably include the cost of using each of the fuels or some other process variable to be optimized. In addition, each boiler should have an equation which is a sum of each fuel multiplied by a corresponding heating value coefficient as equal to an efficiency coefficient times the steam produced by that boiler, e.g. equation (1), $$a_{bfg}*F_{bfg} + a_{cog}*F_{cog} + a_{oil}*F_{oil} - EFF*M = 0 \quad (1)$$

where (i) is a fuel/boiler combination, $a_{(i)}$ is the heating value coefficient, $F_{(i)}$ is the fuel flow rate, EFF is the efficiency coefficient and H is enthalpy acquired by the steam. The heating value coefficient $a_{(i)}$ may be calculated using equation (2), $$a_{(i)} = CV_{(i)}*ETA_{(i)} \quad (2)$$

where CV is the fuel heating value per fuel unit, e.g., Kcal/NM3, and ETA is the combustion efficiency. The efficiency coefficient EFF may be calculated using equation (3), $$EFF = -1*ETA_{ref}/(ETA_{load}*EFF_{foul}) \quad (3)$$

where $ETA_{ref}$ is the combustion efficiency of a reference fuel, e.g., oil, $ETA_{load}$ is the combustion efficiency of the boiler for the load assigned to the boiler and $EFF_{foul}$ is a constant with a value between 0 and $-1$ throughout the load range of the boiler and represents efficiency degradation due to fouling. Other equations can be added to the linear programming matrix representing constraints on the process, such as the maximum load, maximum total amount of coke oven gas and blast furnace gas available, etc.

Figure 4:
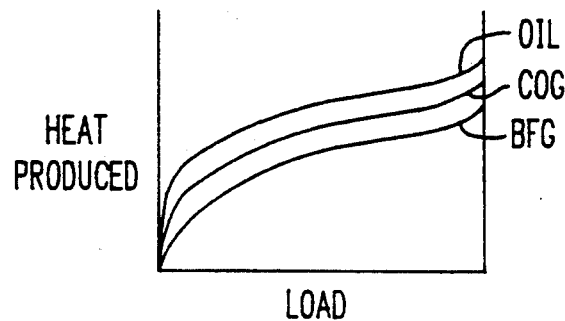
FIG. 4 is a graph of heat produced versus load for different fuels in a multiple-fuel fired boiler.

Initially, values are assigned 62 to the matrix elements assuming, e.g., maximum efficiency in each of the boilers. More accurate heating value and efficiency coefficients can be determined by storing a table indicating the heat produced versus load for each boiler. A graphical representation of the data which would be stored in such a table is illustrated in FIG. 4. Such data is typically available from the manufacturer of a boiler based upon design parameters and can be verified by experimentation on a boiler.

Once values have been assigned to the matrix elements, the matrix can be solved 64 by executing a computer program. Programs for solving such matrices are available commercially, including LP88 from Eastern Software Products, Inc. of Alexandria, Va. An example of data input to and output from such a program to find a solution for a matrix representing four boilers, each supplied with three fuels provided in the tables entitled Boiler Optimization Matrix, Starting solution, Augmented Matrix and Optimal Solution. On the in first run of the program, it would be impossible to determine whether an optimum solution has been found, i.e., whether the solution has converged 66. Therefore, the matrix elements are modified 68 according to a test strategy.

Figure 5:
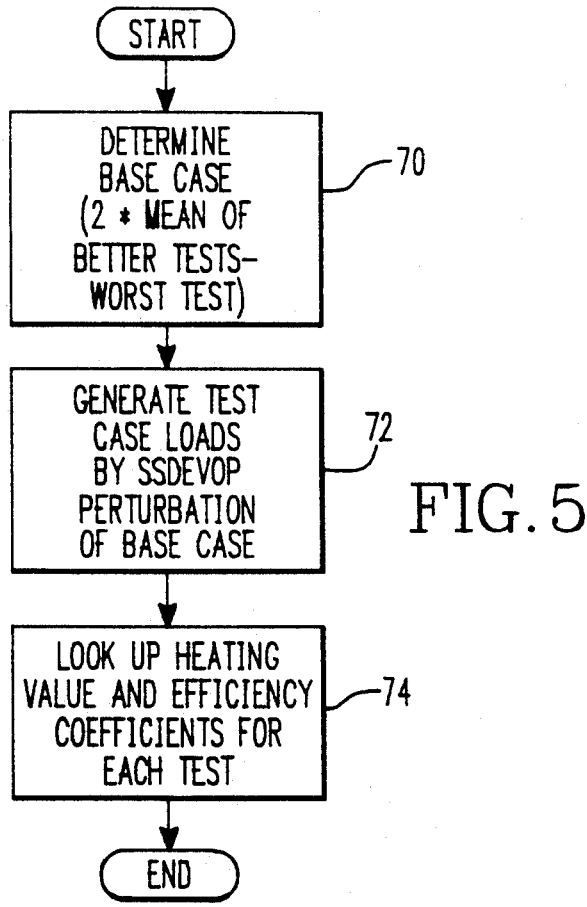
FIGS. 5 and 7 are flowcharts of test strategies used in the first and second embodiments, respectively.

In the first embodiment of the present invention, the test strategy uses the SSDEVOP technique illustrated by the flowchart in FIG. 5 which corresponds to the tabulation in FIG. 1. In the case of the system illustrated in FIG. 2, the loads on three of the boilers in the solution from the linear programming matrix may be used to determine 70 the base case variables $V_{10}$, $V_{20}$ and $V_{30}$. If one of the boilers is not in use during the first solution of the matrix, the load on that boiler should not be used in the base case. If all boilers are in use, any boiler can be left out of the base case; its load will be equal to the difference between the total requested load and the sum of the other three boilers' loads. The perturbation amounts, i.e., $\Delta_1$, $\Delta_2$ and $\Delta_3$, may be 1%-5% of the corresponding load or may all be the same value, e.g., 1% of the largest load. The test cases #1-#4 are then generated 72 as indicated in FIG. 1 and these loads are used to determine 74 the heating value coefficients and efficiency coefficients for each fuel/boiler combination.

The program is then executed to solve 64 the linear programming matrix for each of the test cases. The best of the test cases can then be compared with the previous best solution to determine whether the SSDEVOP process has converged 66. Assuming non-convergence, the SSDEVOP technique requires that the mean of the three better cases for each of the loads be found and a new base case calculated 70 by doubling the mean of the better tests and subtracting the load of the worst test. The test caseloads are then generated 72 as discussed above for the initial case and the heating value and efficiency coefficients are determined 74.

When the best case in the new set of tests does not significantly improve on the best case of the previous set of tests, convergence will be found 66 and the controls can be adjusted 76 using the settings in the best solution. As known in the art and described in the '714 and '114 patents, an additional loop can be added to the method illustrated in FIG. 3 where instead of immediately adjusting controls after convergence is found, the value of the perturbations, i.e., $\Delta_1$, $\Delta_2$ and $\Delta_3$ is reduced, e.g., from 5% to 1% of the corresponding load, and the matrix elements are again modified 68.

Figure 6:
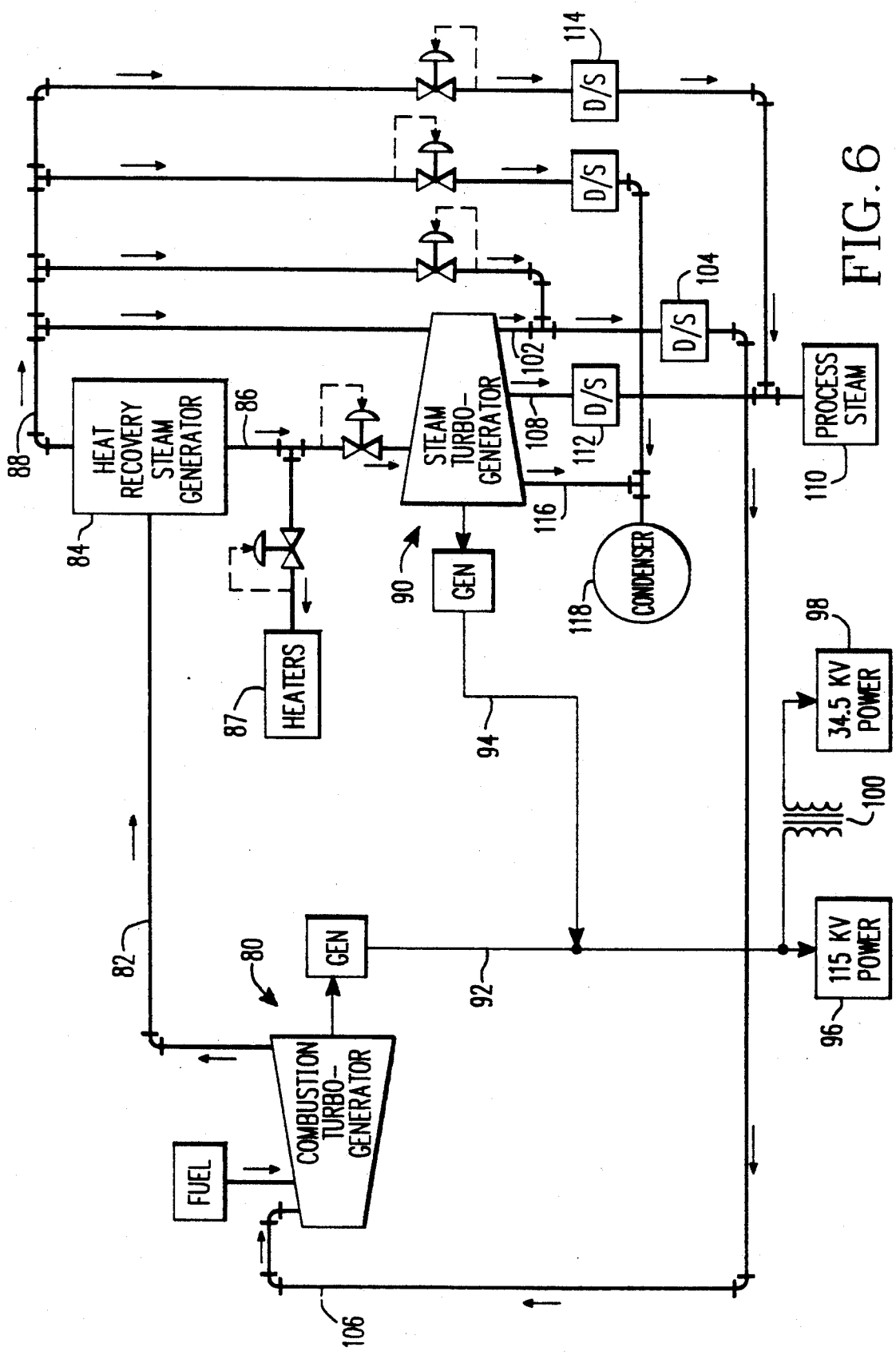
FIG. 6 is a block diagram of a steam and electricity cogeneration plant to which the present invention can be applied.

In the second embodiment of the present invention, the test strategy uses results from the solution of the linear programming matrix to correct equations in the matrix. This test strategy can be used where the linear programming matrix contains equations that are linear approximations of highly nonlinear relationships. An example of an electricity/steam cogeneration system is illustrated in FIG. 6. A combustion turbogenerator 80 outputs exhaust gas 82 to a heat recovery steam generator 84. Low pressure steam 86 from the heat recovery steam generator 84 is supplied to heaters 87 and if there is a surplus, supplied along with high pressure steam 88 to a steam turbogenerator 90. Electrical supply lines 92, 94 from the combustion 80 and steam 90 turbogenerators supply 115 kV power 96 to, e.g., an electrical utility and r also may be reduced to, e.g., 34.5 kV power 98 by a transformer 100 to be supplied to an industrial user.

The high pressure steam 88 from the heat recovery steam generator 84 can also be combined with the high pressure steam 102 from the steam turbogenerator 90 to be supplied to the combustion turbogenerator 80 to reduce nitrous oxide (NOx) emissions, after passing through a desuperheater 104. The resulting NOx steam 106 increases the power generated by the combustion turbogenerator 80. To prevent damage to the combustion turbogenerator 80, the ratio of NOx steam flow to fuel flow must not exceed a maximum value. Steam 108 from the steam turbogenerator 90 may also be supplied as process steam 110 to an industrial user after passing through a desuperheater 112. Some of the high pressure steam 88 from the heat recovery steam generator 84 may also be supplied as process steam 110 after passing through a desuperheater 114. The remaining steam 116 from the steam turbogenerator 90 and any remaining high pressure steam 88 from the heat recovery steam generator 84 is supplied to a condenser 118. The system illustrated in FIG. 6 will be termed a cogeneration system herein, since the steam is used for more than just producing electricity, even if only to reduce NOx emissions.

Figure 7:
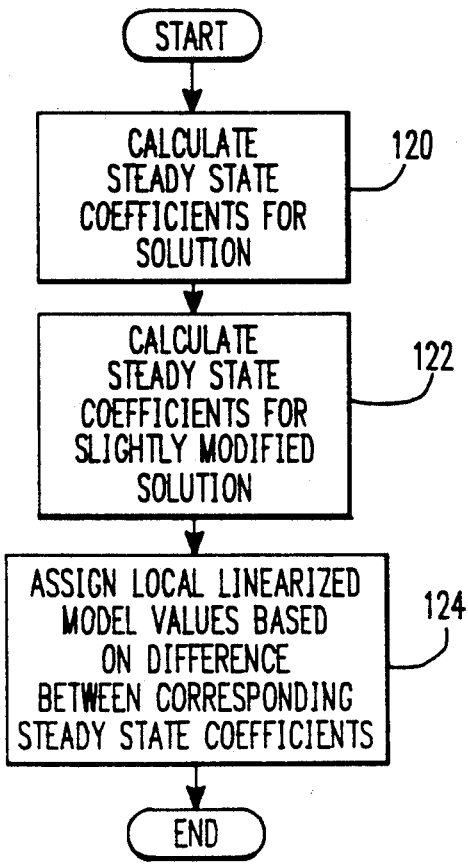

The type of system illustrated in FIG. 6 is very difficult to model due to the large number of nonlinear and interacting (closely coupled) relationships. One of ordinary skill in the art of designing such systems can provide models for the operation of individual components, based either on design parameters or experimentation on an operating unit. As illustrated in FIG. 7 and described in the section entitled On-line Optimization Matrix and the following sections, these component models can be used to ca a coefficients of equations in the linear programming matrix which represent a first steady state model of the cogeneration system by using a solution of the linear programming model. As discussed above, the initial values of the matrix elements can be based upon assumptions of how the system is operating and the model of the system represented by the linear programming matrix will become more accurate by applying the present invention as discussed below.

As illustrated in FIG. 7, coefficients for a second steady state model are calculated 122 by slightly modifying the solution of the linear programming matrix used to calculate 120 the first steady state model coefficients. The rate of change between the first and second steady state models can be easily calculated from the first and second steady state model solution values. A linear approximation of the nonlinear relationships in the cogeneration system can thus be represented 124 in the linear programming matrix by assigning 84 local linearized model coefficient values to matrix elements representing effects of changes from conditions in steady state operation of the cogeneration system.

The linear programming matrix which results 68 (FIG. 3) from the method illustrated in FIG. 7 and described above, can be solved 64 to provide a new set of data to calculate 120, 122, 124 a more accurate linear approximation of the cogeneration system for a requested steam load. When there is no significant change in the solution of the linear programming matrix, typically within three iterations, the settings of the components represented by the solution to the linear programming matrix can be used to adjust 76 the controls of the cogeneration system.

The many features and advantages of the present invention are apparent from the detailed specification, and thus it is intended by the appended claims to cover all such features and advantages of the procedure which fall within the true spirit and scope of the invention. Further, since numerous modifications and changes will readily occur to those skilled in the art from the disclosure of this invention, it is not desired to limit the invention to the exact construction and operation illustrated and described, accordingly, suitable modifications and equivalents may be resorted to, all falling within the scope and spirit of the invention.

| BOILER OPTIMIZATION MATRIX STARTING MATRIX | | | | | | | |
|---|---|---|---|---|---|---|---|
| EREG1 BASIS: NONE | | OBJECTIVE: MIN CONSTRAINTS: 27 | | VARIABLES: 20 SLACKS: 16 | | DATE 06-22-1989 TIME 10:16:18 | |
| | SW1 | SW2 | SW3 | SW4 | BFG1 | COG1 | OIL1 |
| COST | | | | | 8.0500 | 41.650 | 153.40 | COST
| SW.1 | 1.0000 | | | | | | | SW.1
| SW.2 | | 1.0000 | | | | | | SW.2
| SW.3 | | | 1.0000 | | | | | SW.3
| SW.4 | | | | 1.0000 | | | | SW.4
| Y.1 | | | | | 1.0090 | 6.0810 | 13.830 | Y.1
| Y.2 | | | | | | | | Y.2
| Y.3 | | | | | | | | Y.3
| Y.4 | | | | | | | | Y.4
| BFG | | | | | 1.0000 | | | BFG
| COG | | | | | | 1.000 | | COG
| STM | | | | | | | | STM
| Y.8 | −40.000 | | | | 1.0000 | | | Y.8
| Y.9 | −6.0000 | | | | | 1.0000 | | Y.9
| Y.10 | −90.000 | | | | | | | Y.10
| Y.11 | −15.000 | | | | | | | Y.11
| Y.12 | | −40.000 | | | | | | Y.12
| Y.13 | | −6.0000 | | | | | | Y.13
| Y.14 | | −90.000 | | | | | | Y.14
| Y.15 | | −15.000 | | | | | | Y.15
| Y.16 | | | −70.000 | | | | | Y.16
| Y.17 | | | −11.000 | | | | | Y.17
| Y.18 | | | −160.00 | | | | | Y.18
| Y.19 | | | −20.000 | | | | | Y.19
| Y.20 | | | | −70.000 | | | | Y.20
| Y.21 | | | | −11.000 | | | | Y.21
| Y.22 | | | | −160.00 | | | | Y.22
| Y.23 | | | | −20.000 | | | | Y.23
| | SW1 | SW2 | SW3 | SW4 | BFG1 | COG1 | OIL1 |
| | STM1 | BFG2 | COG2 | OIL2 | STM2 | BFG3 | COG3 |
| COST | | 8.0500 | 41.650 | 153.40 | | 8.0500 | 41.650 | COST
| SW.1 | | | | | | | | SW.1
| SW.2 | | | | | | | | SW.2
| SW.3 | | | | | | | | SW.3
| SW.4 | | | | | | | | SW.4

BOILER OPTIMIZATION MATRIX
STARTING MATRIX

| | STM1 | BFG2 | COG2 | OIL2 | STM2 | BFG3 | COG3 | |
|---|---|---|---|---|---|---|---|---|
| Y.1 | −1.0000 | | | | | | | Y.1 |
| Y.2 | | .99000 | 5.9600 | 13.550 | −1.0000 | | | Y.2 |
| Y.3 | | | | | | .96000 | 5.7800 | Y.3 |
| Y.4 | | | | | | | | Y.4 |
| BFG | | 1.0000 | | | | 1.0000 | | BFG |
| COG | | | 1.0000 | | | | 1.0000 | COG |
| STM | 1.0000 | | | | 1.0000 | | | STM |
| Y.8 | | | | | | | | Y.8 |
| Y.9 | | | | | | | | Y.9 |
| Y.10 | 1.0000 | | | | | | | Y.10 |
| Y.11 | 1.0000 | | | | | | | Y.11 |
| Y.12 | | 1.0000 | | | | | | Y.12 |
| Y.13 | | | 1.0000 | | | | | Y.13 |
| Y.14 | | | | | 1.0000 | | | Y.14 |
| Y.15 | | | | | 1.0000 | | | Y.15 |
| Y.16 | | | | | | 1.0000 | | Y.16 |
| Y.17 | | | | | | | 1.0000 | Y.17 |
| Y.18 | | | | | | | | Y.18 |
| Y.19 | | | | | | | | Y.19 |
| Y.20 | | | | | | | | Y.20 |
| Y.21 | | | | | | | | Y.21 |
| Y.22 | | | | | | | | Y.22 |
| Y.23 | | | | | | | | Y.23 |

| | OIL3 | STM3 | BFG4 | COG4 | OIL4 | STM4 | |
|---|---|---|---|---|---|---|---|
| COST | 153.40 | | 8.0500 | 41.650 | 153.40 | | COST |
| SW.1 | | | | | | | SW.1 |
| SW.2 | | | | | | | SW.2 |
| SW.3 | | | | | | | SW.3 |
| SW.4 | | | | | | | SW.4 |
| Y.1 | | | | | | | Y.1 |
| Y.2 | | | | | | | Y.2 |
| Y.3 | 13.140 | −1.0000 | | | | | Y.3 |
| Y.4 | | | .94000 | 5.6600 | 12.860 | −1.0000 | Y.4 |
| BFG | | | 1.0000 | | | | BFG |
| COG | | | | 1.0000 | | | COG |
| STM | | 1.0000 | | | | 1.0000 | STM |
| Y.8 | | | | | | | Y.8 |
| Y.9 | | | | | | | Y.9 |
| Y.10 | | | | | | | Y.10 |
| Y.11 | | | | | | | Y.11 |
| Y.12 | | | | | | | Y.12 |
| Y.13 | | | | | | | Y.13 |
| Y.14 | | | | | | | Y.14 |
| Y.15 | | | | | | | Y.15 |
| Y.16 | | | | | | | Y.16 |
| Y.17 | | | | | | | Y.17 |
| Y.18 | | 1.0000 | | | | | Y.18 |
| Y.19 | | 1.0000 | | | | | Y.19 |
| Y.20 | | | 1.0000 | | | | Y.20 |
| Y.21 | | | | 1.0000 | | | Y.21 |
| Y.22 | | | | | | 1.0000 | Y.22 |
| Y.23 | | | | | | 1.0000 | Y.23 |

| | OIL3 | STM3 | BFG4 | COG4 | OIL4 | STM4 | | |
|---|---|---|---|---|---|---|---|---|
| | | | | | | | RHS | |
| COST | | | | | | | .0000000 | COST |
| SW.1 | | | | | | | = 1.000000 | SW.1 |
| SW.2 | | | | | | | = 1.000000 | SW.2 |
| SW.3 | | | | | | | = 1.000000 | SW.3 |
| SW.4 | | | | | | | = 1.000000 | SW.4 |
| Y.1 | | | | | | | = .0000000 | Y.1 |
| Y.2 | | | | | | | = .0000000 | Y.2 |
| Y.3 | | | | | | | = .0000000 | Y.3 |
| Y.4 | | | | | | | = .0000000 | Y.4 |
| BFG | | | | | | | = 150.0000 | BFG |
| COG | | | | | | | = 15.00000 | COG |
| STM | | | | | | | = 435.0000 | STM |
| Y.8 | | | | | | | <= .0000000 | Y.8 |
| Y.9 | | | | | | | <= .0000000 | Y.9 |
| Y.10 | | | | | | | <= .0000000 | Y.10 |
| Y.11 | | | | | | | >= .0000000 | Y.11 |
| Y.12 | | | | | | | <= .0000000 | Y.12 |
| Y.13 | | | | | | | <= .0000000 | Y.13 |
| Y.14 | | | | | | | <= .0000000 | Y.14 |
| Y.15 | | | | | | | >= .0000000 | Y.15 |
| Y.16 | | | | | | | <= .0000000 | Y.16 |
| Y.17 | | | | | | | <= .0000000 | Y.17 |
| Y.18 | | | | | | | <= .0000000 | Y.18 |
| Y.19 | | | | | | | >= .0000000 | Y.19 |

BOILER OPTIMIZATION MATRIX
STARTING MATRIX

| | | |
|---|---|---|
| Y.20 | <= .0000000 | Y.20 |
| Y.21 | <= .0000000 | Y.21 |
| Y.22 | <= .0000000 | Y.22 |
| Y.23 | >= .0000000 | Y.23 |
| | RHS | |

BOILER OPTIMIZATION MATRIX
STARTING MATRIX for SSDEVOP

| EREG11 | OBJECTIVE: MIN | VARIABLES: 20 | DATE 06-22-1989 |
|---|---|---|---|
| BASIS: NONE | CONSTRAINTS: 30 | SLACKS: 16 | TIME 10:23:16 |

| | SW1 | SW2 | SW3 | SW4 | BFG1 | COG1 | OIL1 | |
|---|---|---|---|---|---|---|---|---|
| COST | | | | | 8.0500 | 41.650 | 153.40 | COST |
| SW.1 | 1.0000 | | | | | | | SW.1 |
| SW.2 | | 1.0000 | | | | | | SW.2 |
| SW.3 | | | 1.0000 | | | | | SW.3 |
| SW.4 | | | | 1.0000 | | | | SW.4 |
| Y.1 | | | | | 1.0090 | 6.0810 | 13.830 | Y.1 |
| Y.2 | | | | | | | | Y.2 |
| Y.3 | | | | | | | | Y.3 |
| Y.4 | | | | | | | | Y.4 |
| BFG | | | | | 1.0000 | | | BFG |
| COG | | | | | | 1.0000 | | COG |
| STM | | | | | | | | STM |
| Y.8 | −40.000 | | | | 1.0000 | | | Y.8 |
| Y.9 | −6.0000 | | | | | 1.0000 | | Y.9 |
| Y.10 | −90.000 | | | | | | | Y.10 |
| Y.11 | −15.000 | | | | | | | Y.11 |
| Y.12 | | −40.000 | | | | | | Y.12 |
| Y.13 | | −6.0000 | | | | | | Y.13 |
| Y.14 | | −90.000 | | | | | | Y.14 |
| Y.15 | | −15.000 | | | | | | Y.15 |
| Y.16 | | | −70.000 | | | | | Y.16 |
| Y.17 | | | −11.000 | | | | | Y.17 |
| Y.18 | | | −160.00 | | | | | Y.18 |
| Y.19 | | | −20.000 | | | | | Y.19 |
| Y.20 | | | | −70.000 | | | | Y.20 |
| Y.21 | | | | −11.000 | | | | Y.21 |
| Y.22 | | | | −160.00 | | | | Y.22 |
| Y.23 | | | | −20.000 | | | | Y.23 |
| Y.24 | | | | | | | | Y.24 |
| Y.25 | | | | | | | | Y.25 |
| Y.26 | | | | | | | | Y.26 |

AUGMENTED MATRIX

| | SW1 | SW2 | SW3 | SW4 | BFG1 | COG1 | OIL1 | |
|---|---|---|---|---|---|---|---|---|
| | STM1 | BFG2 | COG2 | OIL2 | STM2 | BFG3 | COG3 | |
| COST | | 8.0500 | 41.650 | 153.40 | | 8.0500 | 41.650 | COST |
| SW.1 | | | | | | | | SW.1 |
| SW.2 | | | | | | | | SW.2 |
| SW.3 | | | | | | | | SW.3 |
| SW.4 | | | | | | | | SW.4 |
| Y.1 | −1.0300 | | | | | | | Y.1 |
| Y.2 | | .99000 | 5.9600 | 13.550 | −1.0300 | | | Y.2 |
| Y.3 | | | | | | .96000 | 5.7800 | Y.3 |
| Y.4 | | | | | | | | Y.4 |
| BFG | | 1.0000 | | | | 1.0000 | | BFG |
| COG | | | 1.0000 | | | | 1.0000 | COG |
| STM | 1.0000 | | | | 1.0000 | | | STM |
| Y.8 | | | | | | | | Y.8 |
| Y.9 | | | | | | | | Y.9 |
| Y.10 | 1.0000 | | | | | | | Y.10 |
| Y.11 | 1.0000 | | | | | | | Y.11 |
| Y.12 | | 1.0000 | | | | | | Y.12 |
| Y.13 | | | 1.0000 | | | | | Y.13 |
| Y.14 | | | | | 1.0000 | | | Y.14 |
| Y.15 | | | | | 1.0000 | | | Y.15 |
| Y.16 | | | | | | 1.0000 | | Y.16 |
| Y.17 | | | | | | | 1.0000 | Y.17 |
| Y.18 | | | | | | | | Y.18 |
| Y.19 | | | | | | | | Y.19 |
| Y.20 | | | | | | | | Y.20 |
| Y.21 | | | | | | | | Y.21 |
| Y.22 | | | | | | | | Y.22 |
| Y.23 | | | | | | | | Y.23 |
| Y.24 | 1.0000 | | | | | | | Y.24 |
| Y.25 | | | | | 1.0000 | | | Y.25 |
| Y.26 | | | | | | | | Y.26 |

-continued

BOILER OPTIMIZATION MATRIX
STARTING MATRIX for SSDEVOP

| | STM1 | BFG2 | COG2 | OIL2 | STM2 | BFG3 | COG3 | |
|---|---|---|---|---|---|---|---|---|
| | OIL3 | STM3 | BFG4 | COG4 | OIL4 | STM4 | | |
| COST | 153.40 | | 8.0500 | 41.650 | 153.40 | | | COST |
| SW.1 | | | | | | | | SW.1 |
| SW.2 | | | | | | | | SW.2 |
| SW.3 | | | | | | | | SW.3 |
| SW.4 | | | | | | | | SW.4 |
| Y.1 | | | | | | | | Y.1 |
| Y.2 | | | | | | | | Y.2 |
| Y.3 | 13.140 | −1.0800 | | | | | | Y.3 |
| Y.4 | | | .94000 | 5.6600 | 12.860 | −1.0100 | | Y.4 |
| BFG | | | 1.0000 | | | | | BFG |
| COG | | | | 1.0000 | | | | COG |
| STM | | 1.0000 | | | | 1.0000 | | STM |
| Y.8 | | | | | | | | Y.8 |
| Y.9 | | | | | | | | Y.9 |
| Y.10 | | | | | | | | Y.10 |
| Y.11 | | | | | | | | Y.11 |
| Y.12 | | | | | | | | Y.12 |
| Y.13 | | | | | | | | Y.13 |
| Y.14 | | | | | | | | Y.14 |
| Y.15 | | | | | | | | Y.15 |
| Y.16 | | | | | | | | Y.16 |
| Y.17 | | | | | | | | Y.17 |
| Y.18 | | 1.0000 | | | | | | Y.18 |
| Y.19 | | 1.0000 | | | | | | Y.19 |
| Y.20 | | | 1.0000 | | | | | Y.20 |
| Y.21 | | | | 1.0000 | | | | Y.21 |
| Y.22 | | | | | | 1.0000 | | Y.22 |
| Y.23 | | | | | | 1.0000 | | Y.23 |
| Y.24 | | | | | | | | Y.24 |
| Y.25 | | | | | | | | Y.25 |
| Y.26 | | 1.0000 | | | | | | Y.26 |
| | OIL3 | STM3 | BFG4 | COG4 | OIL4 | STM4 | | |

| | RHS | |
|---|---|---|
| COST | .0000000 | COST |
| SW.1 | = 1.000000 | SW.1 |
| SW.2 | = 1.000000 | SW.2 |
| SW.3 | = 1.000000 | SW.3 |
| SW.4 | = 1.000000 | SW.4 |
| Y.1 | = .0000000 | Y.1 |
| Y.2 | = .0000000 | Y.2 |
| Y.3 | = .0000000 | Y.3 |
| Y.4 | = .0000000 | Y.4 |
| BFG | = 150.0000 | BFG |
| COG | = 15.00000 | COG |
| STM | = 435.0000 | STM |
| Y.8 | <= .0000000 | Y.8 |
| Y.9 | <= .0000000 | Y.9 |
| Y.10 | <= .0000000 | Y.10 |
| Y.11 | >= .0000000 | Y.11 |
| Y.12 | <= .0000000 | Y.12 |
| Y.13 | <= .0000000 | Y.13 |
| Y.14 | <= .0000000 | Y.14 |
| Y.15 | >= .0000000 | Y.15 |
| Y.16 | <= .0000000 | Y.16 |
| Y.17 | <= .0000000 | Y.17 |
| Y.18 | <= .0000000 | Y.18 |
| Y.19 | >= .0000000 | Y.19 |
| Y.20 | <= .0000000 | Y.20 |
| Y.21 | <= .0000000 | Y.21 |
| Y.22 | <= .0000000 | Y.22 |
| Y.23 | >= .0000000 | Y.23 |
| Y.24 | = 85.00000 | Y.24 |
| Y.25 | = 85.00000 | Y.25 |
| Y.26 | = 155.0000 | Y.26 |
| | RHS | |

STARTING SOLUTION

| MINIMUM | ENTERS: COG3 | BASIS X: 16 | VARIABLES: 20 |
|---|---|---|---|
| PIVOTS: 28 | LEAVES: COG2 | BASIS S: 11 | SLACKS: 16 |
| LAST INV: 0 | DELTA −.0039632 | | COST 4156.618 |
| CONSTRAINTS: 27 | | | |

| BASIS | STM1 | STM2 | STM3 | STM4 | S.25 | BFG2 | BFG3 | S.12 | BFG4 |
|---|---|---|---|---|---|---|---|---|---|
| COG4 | S.27 | S.15 | S.13 | OIL1 | SW1 | S.19 | COG3 | OIL2 | SW2 |

-continued

| S.23 | S.21 | DIL3 | SW3 | S.24 | S.17 | S.26 | SW4 | | |
|---|---|---|---|---|---|---|---|---|---|
| PRIMAL | 90.000 | 90.000 | 160.00 | 95.000 | .85866 | 40.000 | 70.000 | 40.000 | 40.000 |
| 10.141 | 75.000 | 75.000 | 6.0000 | 6.5076 | 1.0000 | 75.000 | 4.8587 | 3.7196 | 1.0000 |
| 140.00 | 6.1413 | 4.9252 | 1.0000 | 30.000 | 6.0000 | 65.000 | 1.0000 | | |
| DUAL | −74.696 | −54.122 | −39.660 | .00000 | 11.092 | 11.321 | 11.674 | 11.922 | −3.1565 |
| .827 | 11.922 | .00000 | .00000 | −.82996 | .00000 | −.00134 | .00000 | −.60075 | .00000 |
| .00083 | .00000 | −.24751 | .00000 | .00000 | .00000 | .00000 | .00000 | | |

AUGMENTED MATRIX INITIAL SOLUTION

| MINIMUM | | ENTERS: COG3 | | BASIS X: 16 | | VARIABLES: 20 | | | |
|---|---|---|---|---|---|---|---|---|---|
| PIVOTS: 25 | | LEAVES: COG2 | | BASIS S: 14 | | SLACKS: 16 | | | |
| LAST INV: 0 | | DELTA −.0039632 | | COST 4380.047 | | CONSTRAINTS: 30 | | | |

| BASIS | S.14 | S.18 | S.22 | STM4 | OIL1 | OIL2 | OIL3 | S.20 | BFG4 |
|---|---|---|---|---|---|---|---|---|---|
| COG4 | S.27 | S.12 | S.13 | STM1 | S.15 | BFG2 | COG3 | STM2 | S.17 |
| BFG3 | S.21 | STM3 | S.23 | S.24 | S.17 | S.26 | SW4 | SW1 | SW2 |
| SW3 | | | | | | | | | |
| PRIMAL | 5.0000 | 5.0000 | 5.0000 | 110.00 | 6.3304 | 3.5387 | 6.7397 | 11.957 | 51.95 |
| 11.000 | 90.000 | 40.000 | 6.0000 | 85.000 | 70.000 | 40.000 | 4.0000 | 85.000 | 70.00 |
| 58.043 | 7.0000 | 155.00 | 135.00 | 18.043 | 6.0000 | 50.000 | 1.0000 | 1.0000 | 1.0000 |
| DUAL | .0000 | −.02068 | .00000 | −.05465 | 11.092 | 11.321 | 11.674 | 11.923 | −3.157 |
| 1.0000 | | | | | | | | | |
| −25.827 | 12.042 | .00000 | .00000 | .00000 | .00000 | −.00052 | .00000 | .00000 | .0000 |
| .00000 | .00000 | .00000 | .00000 | .00000 | −.00497 | .00000 | .00000 | −.61731 | −.3812 |
| .56633 | | | | | | | | | |

OPTIMAL SOLUTION

| MINIMUM | | ENTERS: COG3 | | BASIS X: 17 | | VARIABLES: 20 | | | |
|---|---|---|---|---|---|---|---|---|---|
| PIVOTS: 25 | | LEAVES: COG2 | | BASIS S: 13 | | SLACKS: 16 | | | |
| LAST INV: 0 | | DELTA −.0039632 | | COST 4255.048 | | CONSTRAINTS: 30 | | | |

| BASIS | S.14 | S.18 | S.22 | STM4 | OIL1 | OIL2 | OIL3 | OIL4 | BFG4 |
|---|---|---|---|---|---|---|---|---|---|
| COG4 | S.27 | S.12 | S.13 | STM1 | S.15 | BFG2 | COG3 | STM2 | S.19 |
| BFG3 | S.21 | STM3 | S.23 | S.20 | S.17 | S.26 | SW4 | SW1 | SW2 |
| SW3 | | | | | | | | | |
| PRIMAL | .00000 | .00000 | 31.000 | 126.00 | 6.5076 | 3.9188 | 5.3318 | .03577 | 70.00 |
| 11.000 | 106.00 | 40.000 | 6.000 | 90.000 | 75.000 | 40.000 | 4.000 | 90.000 | 75.00 |
| 40.000 | 7.00000 | 129.00 | 109.00 | 30.000 | 6.0000 | 34.000 | 1.0000 | 1.0000 | 1.000 |
| 1.0000 | | | | | | | | | |
| DUAL | .00000 | −.02068 | .00000 | −.79668 | 11.092 | 11.321 | 11.674 | 11.928 | −3.157 |
| −25.827 | 12.167 | .00000 | .00000 | .00000 | .00000 | −.00052 | .00000 | .00000 | .00000 |
| .00000 | .00000 | .00000 | .00000 | −.00545 | −.03776 | .00000 | .00000 | −1.0752 | −.5063 |
| −.2927 | | | | | | | | | |

ON-LINE OPTIMIZATION MATRIX

An examination of the available data indicates the essential linearity of equipment behavior, at least over restricted load ranges, and thus suggests that the linear programming technique for the optimization of closely-coupled systems would be appropriate and practical in this case. The flowsheet of FIG. 6 is the network to be implemented in the LP matrix, the matrix consisting of:

a. Variables 1 through 24 forming the columns of the matrix
b. Energy and Materials Balances, which form a large number of the rows of the matrix
c. The remaining rows, consisting of fixed or adjustable upper or lower constraints or bounds to appropriate variables.
d. The unit cost or revenue obtained from those resources (variables) which are either purchased or sold.

List of Variables

The variables shown in the columns of the matrix listed in Table 5.0, are defined below:

| I.D. | Name | Description | Units |
|---|---|---|---|
| 1. | GTGGAS | GTG - Fuel flow | MBTU/h |
| 2. | GTGPWR | GTG - Power due to fuel | MW |
| 3. | NOXPWR | GTG - Incremental power from Nox steam | MW |
| 4. | TOTPWR | GTG - Total power generated | MW |
| 5. | NOXGT2 | GTG - Nox due to Fuel | lb/h |

-continued

| I.D. | Name | Description | Units |
|---|---|---|---|
| 6. | NINCG2 | GTG - Nox increment due to steam | lb/h |
| 7. | TOTNX2 | GTG - Total nox from GT2 | lb/h |
| 8. | PM10G2 | $PM_{10}$ from GTG2 fuel | lb/h |
| 9. | HPSTM | HRSG - H.P. Steam generated | Klb/h |
| 10. | LPSTM | HRSG - L.P. Steam generated | Klb/h |
| 11. | THR | STG - Throttle flow | Klb/h |
| 12. | NOXEX | STG - Nox steam extraction flow | Klb/h |
| 13. | PREX | STG - Process Steam extraction flow | Klb/h |
| 14. | INJ | STG - Injection steam flow | Klb/h |
| 15. | COND | STG - Flow to condenser | Klb/h |
| 16. | STGPWR | STG - Generated power | MW |
| 17. | HPPRV | HP steam/NOX PRV flow | Klb/h |
| 18. | DUMPV | Steam dump valve flow to condenser | Klb/h |
| 19. | PRPRV | HP steam/process steam PRV flow | Klb/h |
| 20. | TOTNX | Total Nox steam flow | Klb/h |
| 21. | HTRST | Steam flow to heaters | Klb/h |
| 22. | SCE2 | Power exported to switchyard | MW |
| 23. | USBTIE | Power sold | MW |
| 24. | PRSTM | Process steam sold | Klb/h |

Costs and Prices

As shown in the first row of the matrix in Table 5.0, the following variables need to be assigned costs or prices:

| GTGPWR | 4.0 | $/MMBTU |
|---|---|---|
| SCE2 | −50.00 | $/MWh |

-continued

| | | |
|---|---|---|
| PRSTM | −3.5 | $/Klb/h |

The cost associated with GTGPWR is the fuel cost in $/MMBTU. This will be inserted by the matrix preparation program and will represent the actual cost of whatever fuel is being fired in the gas turbogenerator.

The cost associated with SCE2 is actually a price and therefore carries a negative sign. It is the effective current revenue received per MWh of electricity exposed via the tie-line SEC2. It will be calculated by the schedule program every hour and stored in a reserved location, from which it will be recovered by the matrix preparation program.

Similarly, the cost of PRSTM also carriers a negative sign and will be calculated by the schedule program and stored in its own reserved location, from which it will be recovered by the matrix preparation program.

OPTIMIZATION MATRIX EQUATIONS

The equations included in the Cogeneration Plant optimization matrix are defined in Table 5.0 and described in the following:

Y.1 Gas Turbogenerator #2 Characteristic Equation

Westinghouse Curve No. CW251-91 shows an essentially linear relationship between fuel and power which varies as a function of temperature. For an ambient temperature of 59 deg.F., the relation ship is:

$$GTGGAS \leq 138.27 + 7.591 * GTGPWR \qquad (Y.1)$$

In practice, the matrix preparation program will contain a model relation generated power to fuel flow as a function of ambient temperature. It will calculate the values of the coefficients needed by Y.1 from this model and load them into the appropriate elements of the matrix.

Y.2 Incremental Power due to Nox Steam

Westinghouse Curve No. CW251-95 shows an essentially linear relationship between incremental power due to Nox steam and the quantity of Nox steam injected. For an ambient temperature of 59 deg.F the relationship is:

$$NOXPWR = 0.1455 * TOTNX \qquad (Y.2)$$

Again, in practice, the matrix preparation program will contain a model relating increase in generated power to N ox steam flow as a function of ambient temperature. It will calculate the values of the coefficient needed by Y.2 from this model and load it into the appropriate element of the matrix.

Y.3 Maximum Nox Steam Flow

As will be seen from Westinghouse Curve No. CW251-95, there is an upper limit to the amount of Nox steam which can be supplied, this amount varying with the ambient temperature.

In practice, the matrix preparation program will contain a model which relates the maximum Nox steam flow to ambient temperature. It will calculate the upper Nox flow limit from this model and load it into the appropriate RHS element of the matrix.

Y.4 Maximum Nox Steam/fuel Flow Heat Ratio

A model relating the maximum allowable Nox steam/Fuel Heat Flow ratio will exist in the matrix preparation program which will compute the ratio and load it into the appropriate element of the matrix. This model has yet to be defined.

Y.5 Total Power Generated by GTG2

The power generated by GTG2 is contributed mainly by the fuel fired and secondarily by the incremental power due to Nox steam. Thus total power:

$$TOTPWR = GTGPWR + NOXPWR \qquad (Y.5)$$

Y.6 Maximum Generated Power

The maximum power which can be generated by GTG2 is 42.5MW, but this will vary with the power factor and reactive capability curve for the generator. The power limit will be calculated by the matrix preparation program from the reactive capability curve and the result stored in the RHS element of equation Y.6.

The reactive capability curves are contained in Data Sheets H.E.P. 4959A and H.E.P. 4960 dated Aug. 20, 1986 and issued by Brush Electrical Machines Ltd.

Y.7 Minimum Generated Power

There is a minimum allowable amount of power which can be generated once the machine is synchronized to the system and this is at present assumed to be 2MW.

Y.8 GTG2 Nox Emission

Data contained on page 194 of Appendix X of The California Energy Commission Staff Report contains the $PM_{10}$ emission rate for the project when firing gas as 0.0289 lb/MMBTU. Thus the relationship is:

$$NOXTG2 = 0.0289 * GTGGAS \qquad (Y.8)$$

Y.9 Nox Decrease due to Nox Steam

Data from a Westinghouse curve dated Feb. 2, 1988 (Mumford), showing the relationship between Nox reduction and Nox steam flow, has been used to determine the following linear relationship:

$$NINCG2 = A_1 * TOTNX \qquad (Y.9)$$

The value of $A_1$ will be calculated from an analysis of the curve referred to above.

Y.10 Total Nox emission

The total Nox emission from GTG2 is given by:

$$TOTNX2 = NOXGT2 - NINCG2 \qquad (Y.10)$$

Y.11 Particulate Emission—GTG2

From page 194 of the CEC Report, the $PM_{10}$ emission is given as 0.0159 lb/MMBTU. The equation relation $PM_{10}$ emission to fuel firing rate is therefore:

$$PM10G2 = 0.0159 * GTGGAS \qquad (Y.11)$$

Y.12 HRSG H.P. Stem Flow vs. Generated Power

The relationship between the flow of the H.P. steam generated in the HRSG as a function of the power generated by GTG2 is derived from data in the Nooter-Eriksen data sheet dated Feb. 7, 1989. The data with gas at 73 deg.F. has been plotted and an approximation to the curve at that temperature is given by:

$$HPSTM = 95 + 1.388*GRGPWR \quad (Y.12)$$

This model will need to be developed further

Y.12 HRSG I.P. Steam Flow vs. Generated Power

The relationship between the flow of L.P. steam generated in the HRSG as a function of the power generated by GTG2 is derived from data in the Nooter-Eriksen data sheet dated Feb. 7, 1989. The data with gas at 73 deg.F. has been plotted and an approximation to the curve at that temperature is given by:

$$LPSTM = 0.576*GTGPWR \quad (Y.12)$$

This model will need to be developed further

Y.14 Steam consumed by Deaerator, etc.

Steam consumed as a function of HRSG H.P. and L.P. steam flows is approximately 0.054 lb/lb HRSG steam. Thus:

$$HTRST = 0.054*HPSTM + 0.054*LPSTEM \quad (Y.14)$$

The values of these two coefficients will need to be further defined and an appropriate model generated if necessary.

Y.15 Steam Turbogenerator Throttle Flow Equation

From the heat balances given in Appendix A of the Westinghouse Contract for the Project, steam flow and power data were extracted for presentation to a regression analysis program. The coefficients in the following model give a 0.5% worst error in predicted throttle flow:

$$THR = 8.5378 + 1.893*NOXEX + 0.707*PREX - 1.077*INJ + 7.598*STGPWR \quad (Y.15)$$

Y.16 STG Steam Balance

The sum of the throttle flow plus injection steam flow must equal the sum of Nox and Process Steam extraction flows and the flow to the condenser. Thus:

$$THR + INJ = NOXEX + PREX + COND \quad (Y.16)$$

Y.17 Maximum Throttle Flow

The maximum throttle flow is assumed to be 170 Klb/h

Y.18 Maximum Nox Steam Flow

The maximum Nox steam flow is assumed to be 37.5 Klb/n

Y.19 Maximum Process Extraction Steam Flow

The maximum Process Steam Extraction flow is assumed to be 109 Klb/h.

Y.20 Minimum Condenser Flow

The flow to the condenser is normally the exhaust from the steam turbogenerator but this may be augmented or replaced by live H.P. steam dumped to the condenser. Thus:

$$(COND + DUMPV) \geq 10 Klb/h \quad (Y.20)$$

Y.21 Maximum Condenser Flow

The maximum condenser flow may be defined as:

$$(COND + DUMPV) \leq 152 \ Klb/h \quad (Y.21)$$

Y.22 Maximum STG Generated Power

The maximum allowable power which can be generated by the steam turbogenerator is subject to the power factor and the reactive capability curve for the generator.

Y.23 Minimum Allowable STG Power

There is a minimum allowable amount of power which can be generated once this machine is synchronized to the system and this is at present assumed to be 2MW.

Y.24 Process Steam Header Flow Balance

Prior to the process steam leaving the plant, steam can enter the process steam header from the process steam extraction port on the STG and via the pressure reducing valve connecting this header to the H.P. Steam supply. It is assumed that 15% water is added at the desuperheater provided for each of these process steam sources. The balance in the process steam header may thus be defined as:

$$PRSTM = 1.15*PREX + 1.15*PRPRV \quad (Y.24)$$

The desuperheating water addition flow ratios given in Y.24 will need to be calculated with greater precision.

Y.25 L.P. Steam Header Balance

The L.P. steam generated by the HRSG is used to supply the deaerator steam, the balance being conducted to the steam injection port of the STG. Thus:

$$LPSTM = INJ + HTRST \quad (Y.25)$$

Y.26 H.P. Steam Header Balance

The H.P. steam leaving the HRSG supplies:
Steam turbogenerator throttle
Dump valve
PRV between H.P. header and Nox steam header
PRV between H.P. header and Process Steam header
The H.P. steam header balance may therefore be defined as:

$$HPSTEM = THR + HPPRV + DUMPV + PRPRV \quad (Y.26)$$

Y.27 Nox Steam Header Balance

The Nox steam header receives steam from the Nox steam extraction port of the STG as well as from the bypass pressure reducing valve. Thus the header balance may be defined as:

$$TOTNX = 1.109*NOXEX + 1.17*HPPRV \quad (Y.27)$$

where a desuperheating water addition rate of 17% is assumed.

Y.28 Power balance

The sum of the generated powers must equal the power dispatched $$TOTPWR + STGPWER = SCER2 + USBTIE \quad (Y.28)$$

Y.29 Power to be Despatched to

The power to be dispatched to electrical utility will be calculated in a DPU as a function of the time of day and period of the year, these data being identified in the VAX schedule program and passed to the DPU over the data highway. The power to be dispatched to SCE (MWMAX) will be received from the DPU over the data highway, so that:

$$SCE2 <= MWMAX \quad (Y.29)$$

Y.30 Power to be Despatched to Industry

The power to be despatched to industry will normally be zero but at times may rise to a limited value when there own generating equipment is down, in order to reduce the maximum demand limit. Thus this relationship is defined as an inequality of the form:

```
IF (SCE/USB TIE OPEN)
    THEN CONST=ZERO
        ELSE CONST=2000 (Large number)
END IF
USBTIE <= CONST
```

Y.31 Process Steam to be Supplied to Industry

This equality determines the quantity of steam to be supplied to industry and would be loaded by the matrix preparation program in accordance with the amount presently being consumed

| | | | | Optimization Matrix | | | | |
|---|---|---|---|---|---|---|---|---|
| MOJAVE | | OBJECTIVE: MIN | | VARIABLES: 24 | DATE 12-14-1989 | | | |
| BASIS: MOJAVE | | CONSTRAINTS: 30 | | SLACKS: 12 | TIME 16:09:57 | | | |
| | GTGGAS | GTGPWR | NOXPWR | TOTPWR | NOXGT2 | NINCG2 | TOTNX2 | |
| COST | 4.0000 | | | | | | | COST |
| Y.1 | 1.0000 | | | | | | | Y.1 |
| Y.2 | | −7.5910 | | | | | | Y.2 |
| Y.3 | | | 1.0000 | | | | | Y.3 |
| Y.4 | .04880 | | | | | | | Y.4 |
| Y.5 | | 1.0000 | 1.0000 | −1.0000 | | | | Y.5 |
| Y.6 | | | | 1.0000 | | | | Y.6 |
| Y.7 | | | | 1.0000 | | | | Y.7 |
| Y.8 | .02890 | | | | −1.0000 | | | Y.8 |
| Y.9 | | | | | | −1.0000 | | Y.9 |
| Y.10 | | | | | 1.0000 | −1.0000 | −1.0000 | Y.10 |
| Y.11 | .01590 | | | | | | | Y.11 |
| Y.12 | | −1.3880 | | | | | | Y.12 |
| Y.13 | | −.57600 | | | | | | Y.13 |
| Y.14 | | | | | | | | Y.14 |
| Y.15 | | | | | | | | Y.15 |
| Y.16 | | | | | | | | Y.16 |
| Y.17 | | | | | | | | Y.17 |
| Y.18 | | | | | | | | Y.18 |
| Y.19 | | | | | | | | Y.19 |
| Y.20 | | | | | | | | Y.20 |
| Y.21 | | | | | | | | Y.21 |
| Y.22 | | | | | | | | Y.22 |
| Y.23 | | | | | | | | Y.23 |
| Y.24 | | | | | | | | Y.24 |
| Y.25 | | | | | | | | Y.25 |
| Y.26 | | | | | | | | Y.26 |
| Y.27 | | | | | | | | Y.27 |
| Y.28 | | | | 1.0000 | | | | Y.28 |
| Y.29 | | | | | | | | Y.29 |
| Y.30 | | | | | | | | Y.30 |
| Y.31 | | | | | | | | Y.31 |
| | GTGGAS | GTGPWR | NOXPWR | TOTPWR | NOXGT2 | NINCG2 | TOTNX2 | |
| | PM10G2 | HPSTM | LPSTM | THR | NOXEX | PREX | INJ | |
| COST | | | | | | | | COST |
| Y.1 | | | | | | | | Y.1 |
| Y.2 | | | | | | | | Y.2 |
| Y.3 | | | | | | | | Y.3 |
| Y.4 | | | | | | | | Y.4 |
| Y.5 | | | | | | | | Y.5 |
| Y.6 | | | | | | | | Y.6 |
| Y.7 | | | | | | | | Y.7 |
| Y.8 | | | | | | | | Y.8 |
| Y.9 | | | | | | | | Y.9 |
| Y.10 | | | | | | | | Y.10 |
| Y.11 | −1.0000 | | | | | | | Y.11 |
| Y.12 | | 1.0000 | | | | | | Y.12 |
| Y.13 | | | 1.0000 | | | | | Y.13 |
| Y.14 | | .05400 | .05400 | | | | | Y.14 |
| Y.15 | | | | 1.0000 | −1.8930 | −.70700 | 1.0770 | Y.15 |
| Y.16 | | | | 1.0000 | −1.0000 | −1.0000 | 1.0000 | Y.16 |

-continued

| | PM10G2 | HPSTM | LPSTM | THR | NOXEX | PREX | INJ | |
|---|---|---|---|---|---|---|---|---|
| Y.17 | | | | 1.0000 | | | | Y.17 |
| Y.18 | | | | | 1.0000 | | | Y.18 |
| Y.19 | | | | | | 1.0000 | | Y.19 |
| Y.20 | | | | | | | | Y.20 |
| Y.21 | | | | | | | | Y.21 |
| Y.22 | | | | | | | | Y.22 |
| Y.23 | | | | | | | | Y.23 |
| Y.24 | | | | | | 1.1500 | | Y.24 |
| Y.25 | | | 1.0000 | | | | −1.0000 | Y.25 |
| Y.26 | | 1.0000 | | −1.0000 | | | | Y.26 |
| Y.27 | | | | | 1.1090 | | | Y.27 |
| Y.28 | | | | | | | | Y.28 |
| Y.29 | | | | | | | | Y.29 |
| Y.30 | | | | | | | | Y.30 |
| Y.31 | | | | | | | | Y.31 |
| | PM10G2 | HPSTM | LPSTM | THR | NOXEX | PREX | INJ | |

| | COND | STGPWR | HPPRV | DUMPV | PRPRV | TOTNX | HTRST | |
|---|---|---|---|---|---|---|---|---|
| COST | | | | | | | | COST |
| Y.1 | | | | | | | | Y.1 |
| Y.2 | | | | | | −.14550 | | Y.2 |
| Y.3 | | | | | | 1.0000 | | Y.3 |
| Y.4 | | | | | | −1.0000 | | Y.4 |
| Y.5 | | | | | | | | Y.5 |
| Y.6 | | | | | | | | Y.6 |
| Y.7 | | | | | | | | Y.7 |
| Y.8 | | | | | | | | Y.8 |
| Y.9 | | | | | | .14440 | | Y.9 |
| Y.10 | | | | | | | | Y.10 |
| Y.11 | | | | | | | | Y.11 |
| Y.12 | | | | | | | | Y.12 |
| Y.13 | | | | | | | | Y.13 |
| Y.14 | | | | | | | −1.0000 | Y.14 |
| Y.15 | | −7.5980 | | | | | | Y.15 |
| Y.16 | −1.0000 | | | | | | | Y.16 |
| Y.17 | | | | | | | | Y.17 |
| Y.18 | | | | | | | | Y.18 |
| Y.19 | | | | | | | | Y.19 |
| Y.20 | 1.0000 | | | 1.0000 | | | | Y.20 |
| Y.21 | 1.0000 | | | 1.0000 | | | | Y.21 |
| Y.22 | | 1.0000 | | | | | | Y.22 |
| Y.23 | | 1.0000 | | | | | | Y.23 |
| Y.24 | | | | | 1.1500 | | | Y.24 |
| Y.25 | | | | | | | −1.0000 | Y.25 |
| Y.26 | | | −1.0000 | −1.0000 | −1.0000 | | | Y.26 |
| Y.27 | | | 1.1770 | | | | −1.0000 | Y.27 |
| Y.28 | | 1.0000 | | | | | | Y.28 |
| Y.29 | | | | | | | | Y.29 |
| Y.30 | | | | | | | | Y.30 |
| Y.31 | | | | | | | | Y.31 |
| | COND | STGPWR | HPPRV | DUMPV | PRPRV | TOTNX | HTRST | |

| | SCE2 | USBTIE | PRSTM | RHS | |
|---|---|---|---|---|---|
| COST | −50.000 | | −3.5000 | .0000000 | COST |
| Y.1 | | | | = 138.2700 | Y.1 |
| Y.2 | | | | = .0000000 | Y.2 |
| Y.3 | | | | <= 50.40000 | Y.3 |
| Y.4 | | | | >= .0000000 | Y.4 |
| Y.5 | | | | = .0000000 | Y.5 |
| Y.6 | | | | <= 42.50000 | Y.6 |
| Y.7 | | | | >= 2.000000 | Y.7 |
| Y.8 | | | | = .0000000 | Y.8 |
| Y.9 | | | | = .0000000 | Y.9 |
| Y.10 | | | | = .0000000 | Y.10 |
| Y.11 | | | | = .0000000 | Y.11 |
| Y.12 | | | | = 95.00000 | Y.12 |
| Y.13 | | | | = .0000000 | Y.13 |
| Y.14 | | | | = .0000000 | Y.14 |
| Y.15 | | | | = 8.537800 | Y.15 |
| Y.16 | | | | = .0000000 | Y.16 |
| Y.17 | | | | <= 170.0000 | Y.17 |
| Y.18 | | | | <= 37.50000 | Y.18 |
| Y.19 | | | | <= 109.0000 | Y.19 |
| Y.20 | | | | >= 10.00000 | Y.20 |
| Y.21 | | | | <= 152.0000 | Y.21 |
| Y.22 | | | | <= 14.90000 | Y.22 |
| Y.23 | | | | >= 2.000000 | Y.23 |
| Y.24 | | −1.0000 | | = .0000000 | Y.24 |
| Y.25 | | | | = .0000000 | Y.25 |
| Y.26 | | | | = .0000000 | Y.26 |
| Y.27 | | | | = .00000000 | Y.27 |
| Y.28 | −1.0000 | −1.0000 | | = .0000000 | Y.28 |
| Y.29 | 1.0000 | | | = 44.00000 | Y.29 |

| | | -continued | | | |
|---|---|---|---|---|---|
| Y.30 | | 1.0000 | | <= .0000000 | Y.30 |
| Y.31 | | 1.0000 | | = 130.00000 | Y.31 |
| | SCE2 USBTIE PRSTM | | | RHS | |

| | | 44 mw AND 130 klB/H | | | |
|---|---|---|---|---|---|
| | SOLUTION IS MINIMUM PRIMAL PROBLEM SOLUTION | | COST — 1051.761436 | | |
| VARIABLE | STATUS | VALUE | COST/UNIT | VALUE/UNIT | NET COST |
| GTGGAS | BASIS | 400.80964 | 4.00000000 | 4.0000000 | .00000000 |
| GTGPWR | BASIS | 34.585646 | .00000000 | .00000000 | .00000000 |
| NOXPWR | BASIS | 2.8459088 | .00000000 | .00000000 | .00000000 |
| TOTPWR | BASIS | 37.431555 | .00000000 | .00000000 | .00000000 |
| NOXGT2 | BASIS | 12.264775 | .00000000 | .00000000 | .00000000 |
| NINCG2 | BASIS | 2.8243933 | .00000000 | .00000000 | .00000000 |
| TOTNX2 | BASIS | 15.089168 | .00000000 | .00000000 | .00000000 |
| PM10G2 | BASIS | 6753.6425 | .00000000 | .00000000 | .00000000 |
| HPSTM | BASIS | 143.00488 | .00000000 | .00000000 | .00000000 |
| LPSTM | BASIS | 19.921332 | .00000000 | .00000000 | .00000000 |
| THR | BASIS | 126.38677 | .00000000 | .00000000 | .00000000 |
| NOXEX | NONBASIS | .00000000 | .00000000 | −3.0113211 | 3.01132 |
| PREX | BASIS | 113.04348 | .00000000 | .00000000 | .00000000 |
| INJ | BASIS | 11.123317 | .00000000 | .00000000 | .00000000 |
| COND | BASIS | 24.46610 | .00000000 | .00000000 | .00000000 |
| STGPWR | BASIS | 6.5684449 | .00000000 | .00000000 | .00000000 |
| HPPRV | BASIS | 16.618106 | .00000000 | .00000000 | .00000000 |
| DUMPV | NONBASIS | .00000000 | .00000000 | −3.1672313 | 3.16723 |
| PRPRV | NONBASIS | .00000000 | .00000000 | −.92799876 | .927998 |
| TOTNX | BASIS | 19.559510 | .00000000 | .00000000 | .00000000 |
| HTRST | BASIS | 8.7980153 | −50.000000 | −50.00000 | .00000000 |
| SCE2 | BASIS | 44.000000 | −50.000000 | −50.00000 | .0000000 |
| USBTIE | NONBASIS | .00000000 | .00000000 | −24.064623 | 24.0646 |
| PRSTM | BASIS | 130.00000 | −3.5000000 | −3.500000 | .00000000 |
| S.3 | BASIS | 30.840490 | .00000000 | .00000000 | .00000000 |
| S.4 | NONBASIS | .00000000 | .00000000 | −8.1046702 | .810467 |
| S.6 | BASIS | 5.0684449 | .00000000 | .00000000 | .00000000 |
| S.7 | BASIS | 35.431555 | .00000000 | .00000000 | .00000000 |
| S.17 | BASIS | 43.613229 | .00000000 | .00000000 | .00000000 |
| S.18 | BASIS | 110.00000 | .00000000 | .00000000 | .00000000 |
| S.19 | BASIS | 16.9566522 | .00000000 | .00000000 | .00000000 |
| S.20 | BASIS | 19.466610 | .00000000 | .00000000 | .00000000 |
| S.21 | BASIS | 135.53339 | .00000000 | .00000000 | .00000000 |
| S.22 | BASIS | 9.0515551 | .00000000 | .00000000 | .00000000 |
| S.23 | BASIS | 5.5684449 | .00000000 | .00000000 | .00000000 |
| S.30 | BASIS | .00000000 | .00000000 | .00000000 | .00000000 |

What is claimed is:

1. A method for optimizing control of a process having interdependent operating conditions determined by a control unit, the operating conditions including controlled supply of a substance, said method comprising the steps of:

(a) defining relationships in a linear programming matrix between the interdependent operating conditions, all constraints on the process sand a process variable for optimization;

(b) assigning initial values to matrix elements in the linear programming matrix;

(c) executing a computer program to solve the linear programming matrix;

(d) modifying selected matrix elements representing a set of the interdependent operating conditions according to a test strategy and adjusting any unselected matrix elements that require change due to said modifying;

(e) executing the computer program to produce a solution of the linear programming matrix after said modifying in step (d);

(f) repeating steps (d) and (e) for each test defined by the test strategy until convergence of the solution of the linear programming matrix resulting in optimized operating conditions; and (g) adjusting the controlled supply of the substance using the control unit to establish the optimized operating conditions indicated by the solution of the linear programming matrix resulting at the convergence in step (f).

2. A method as recited in claim 1,
wherein said defining in step (a) includes defining energy balance equations for a cogeneration system producing steam and electrical power, and
wherein said modifying in step (d) comprises the steps of:

(d1) calculating, from the solution produced in step (c), first values of matrix elements representing a first steady state model of the cogeneration system;

(d2) calculating, from a modification, according to the test strategy, of the solution produced in step (c), a second values of the matrix elements representing a second steady state model of the cogeneration system; and (d3) assigning the first values to the matrix elements representing steady state operation of the cogeneration system and assigning rate of change values, determined in dependence upon differences between the first and second values calculated in steps (d1) and (d2), to matrix elements representing effects of changes from conditions in steady state operation of the cogeneration system.

3. A method as recited in claim 1, wherein the interdependent operating conditions include at least five variable operating conditions,
wherein said defining in step (a) includes defining relationships among the variable operating conditions, and
wherein said modifying in step (d) uses a simplex self-directing evolutionary operation test strategy.

4. A method as recited in claim 3, wherein the interdependent operating conditions include at least 10 variable operating conditions, and
wherein said defining in step (a) includes defining the relationship among the variable operating conditions.

5. A method as recited in claim 3, wherein the process optimized by said method produces steam from a plurality of multiple-fuel fired boilers, and
wherein said defining in step (a) defines the relationships between fuel flow and steam produced for each fuel in each boiler.

6. A method as recited in claim 5 wherein said plurality of multiple-fuel fired boilers include more than two boilers each capable of receiving more than two fuels, in a single steam producing system, and
wherein said defining in step (a) defines coefficients of an equation relating fuel supplied to steam produced for each of the fuels in each of the boilers.

7. A method as recited in claim 1, wherein the process optimized by said method produces steam from a plurality of boilers, each boiler capable of receiving a plurality of fuels,
wherein said defining in step (a) includes defining a sum of each of the plurality of fuels times a heating value coefficient as equal to the steam produced by each of the boilers times an efficiency coefficient, and
wherein said modifying in step (d) uses a simplex self-directing evolutionary operation test strategy.

8. A method as recited in claim 7,
wherein said defining in step (a) allows for variance in the heating value coefficient of each of the fuels in each of the boilers in dependence upon load on each of the boilers, and
wherein said modifying in step (d) includes adjusting each heating value coefficient in dependence upon changes in the load on each of the boilers.

9. A method as recited in claim 8 wherein the heating value coefficients have a non-linear relationship with load on each of the boilers,
wherein said modifying in step (d) comprises the steps of:
(d1) determining a base case load for each boiler;
(d2) generating test cases with different loads for the boilers according to the simplex self-directing evolutionary operation test strategy and the base case load for each boiler determined in step (d1); and
(d3) adjusting each heating value coefficient by determining a value for each fuel/boiler combination in each of the test cases, corresponding to each of the loads, and
wherein said repeating in step (f) is performed for each of the test cases.

10. An apparatus for controlling a process having interdependent operating conditions, the independent operating conditions including controlled supply of a substance, said apparatus comprising:
input means for defining relationships between the operating conditions, all constraints on the process and a process variable to be optmized, in a linear programming matrix;
computer means for assigning initial values to matrix elements in the linear programming matrix, for executing a computer program to solve the linear programming matrix and for modifying selected matrix elements representing a set of the operating conditions according to a test strategy and adjusting any matrix elements that require change due to the modifying until convergence of the solution of the linear programming matrix resulting in optimized operating conditions; and
control means for controlling the supply of the substance to establish the optmized operating conditions indicated by the solution of the linear programming matrix resulting at the convergence of the solution of the linear programming matrix.

11. A method for optimizing production of steam from at least three boilers, each boiler capable of receiving at least three fuels in a fuel mixture determined by a control unit, said method comprising the steps of:
(a) defining relationships in a linear programming matrix between all constraints on the system, a process variable for optimization, each fuel flow times a corresponding heating value coefficient and the steam produced by each of the boilers times a corresponding efficiency coefficient;
(b) assigning initial values to matrix elements in the linear programming matrix;
(c) executing a computer program to solve the linear programming matrix;
(d) modifying load distribution on the boilers according to a simplex self-directing evolutionary operation test strategy and adjusting each heating value and efficiency coefficient as necessary due to nonlinearity between fuel flow and steam produced;
(e) executing the computer program to produce a solution of the linear programming matrix after said modifying in step (d);
(f) repeating steps (d) and (e) for each test defined by the simplex self-directing evolutionary operation test strategy until convergence of the solution of the linear programming matrix; and
(g) adjusting the fuel mixture using the control unit of at least one of the boilers to establish the operating conditions indicated by the solution of the linear programming matrix resulting at the convergence in step (f).

12. A method as recited in claim 11,
wherein said defining in step (a) comprises defining the heating value coefficient for each fuel supplied to a corresponding boiler as a function of load on the corresponding boiler;
wherein said assigning in step (b) comprises assigning to the heating value coefficient for each fuel/boiler combination a maximum value of the function defined in step (a) for the heating value coefficient;
wherein said modifying in step (d) comprises the steps of:
(d1) determining a base case load for each boiler;
(d2) generating test cases with test loads for the boilers determined according to the simplex self-directing evolutionary operation test strategy and the base case load determined in step (d1) for each boiler;
(d3) adjusting each heating value coefficient by determining a value of the function, corresponding to each fuel/boiler combination, for a corresponding one of the test loads, and
wherein said repeating in step (f) is performed for each of the test cases.

* * * * *